United States Patent [19]

Lin et al.

[11] Patent Number: 5,752,194

[45] Date of Patent: May 12, 1998

[54] METHOD AND APPARATUS FOR ASSIGNING CHANNELS TO TRANSMITTERS IN A RADIO COMMUNICATION SYSTEM

[75] Inventors: Jyh-Han Lin, Fort Worth; Alain Charles Louis Briancon, McKinney, both of Tex.

[73] Assignee: Motorola, Inc., Schaumburg, Ill.

[21] Appl. No.: 691,082

[22] Filed: Aug. 1, 1996

[51] Int. Cl.$^6$ .................................................. H04B 17/00
[52] U.S. Cl. ............................................ 455/452; 455/509
[58] Field of Search ................................. 455/450, 452, 455/453, 509, 62, 63

[56] References Cited

U.S. PATENT DOCUMENTS 4,875,038  10/1989  Siwiak et al. .
4,887,265  12/1989  Felix ......................................... 455/450
5,345,597   9/1994  Strawczynski et al. ................. 455/450
5,404,574   4/1995  Benveniste .............................. 455/452
5,594,940   1/1997  Peterson et al. ........................ 455/509

*Primary Examiner*—Amelia Au
*Attorney, Agent, or Firm*—R. Louis Breeden

[57] ABSTRACT

Channels are assigned to a plurality of transmitters (206) in a radio communication system. First, interference constraints are defined (402) for the plurality of transmitters, and channel capacity required to handle traffic for each of the plurality of transmitters is measured (404). Then a mathematical programming technique is applied (406) to minimize the total number of channels assigned in the system, consistent with the interference constraints and the channel capacity required. The programming technique is selected from an integer programming technique (414) and a linear programming technique (408).

8 Claims, 4 Drawing Sheets

METHOD AND APPARATUS FOR ASSIGNING CHANNELS TO TRANSMITTERS IN A RADIO COMMUNICATION SYSTEM

RELATED APPLICATIONS

Application Ser. No. 08/476,771 filed Jun. 7, 1995 by Wang, entitled "Method and Apparatus for Scheduling Message Traffic in a Multicell Radio Communication System."

Application Ser. No. 08/642,360 filed May 3, 1996 by Lin et al., entitled "Method and Apparatus for Time Sharing a Radio Communication Channel."

Application Ser. No. 08/597,049 filed Feb. 5, 1996 by Lin et al., entitled "Method and Apparatus for Transmitting an Outbound Message in a Two-Way Messaging System."

FIELD OF THE INVENTION

This invention relates in general to radio communication systems, and more specifically to a method and apparatus for assigning channels to transmitters.

BACKGROUND OF THE INVENTION

Modern messaging systems utilize multiple channels assigned to a plurality of transmitters covering a corresponding plurality of cells and employ frequency reuse to conserve radio frequency spectrum. Existing channel allocation methods have been based upon heuristic techniques that optimize locally with no performance guarantees. Such techniques do not take into account all available global system information but instead assign channels to transmitters one-by-one based on what is best (according to some criteria) for each assignment. The assignment may appear to be locally optimal in the context of what has already been done. However, an assignment can be bad for future assignments made for other transmitters and thus can be suboptimal for the entire system. In addition, such techniques give no indication of how far away a solution is from optimal.

Thus, what is needed is a more comprehensive channel allocation method. A channel allocation method is needed that takes into consideration a wide variety of system parameters, including available channels and channel capacities, traffic requirements for each of the transmitters, and interference constraints between the transmitters. An efficient global channel allocation method is needed that can determine a best overall solution for the entire system.

SUMMARY OF THE INVENTION

An aspect of the present invention is a method for assigning a plurality of channels to a plurality of transmitters in a radio communication system. The method comprises the steps of defining interference constraints for the plurality of transmitters, measuring a channel capacity required to handle traffic for each of the plurality of transmitters, and applying a mathematical programming technique selected from an integer programming technique and a linear programming technique to minimize a total number of channels assigned in the system, consistent with the interference constraints and the channel capacity required.

Another aspect of the present invention is a controller for assigning a plurality of channels to a plurality of transmitters in a radio communication system. The controller comprises a processing system for directing operations of the controller, a network interface coupled to the processing system for receiving messages from message originators, and a transmitter interface coupled to the processing system for controlling the plurality of transmitters to send the messages. The processing system is programmed to define interference constraints for the plurality of transmitters, measure a channel capacity required to handle traffic for each of the plurality of transmitters, and apply a mathematical programming technique selected from an integer programming technique and a linear programming technique to minimize a total number of channels assigned in the system, consistent with the interference constraints and the channel capacity required.

DESCRIPTION OF THE PREFERRED EMBODIMENT

Figure 1:
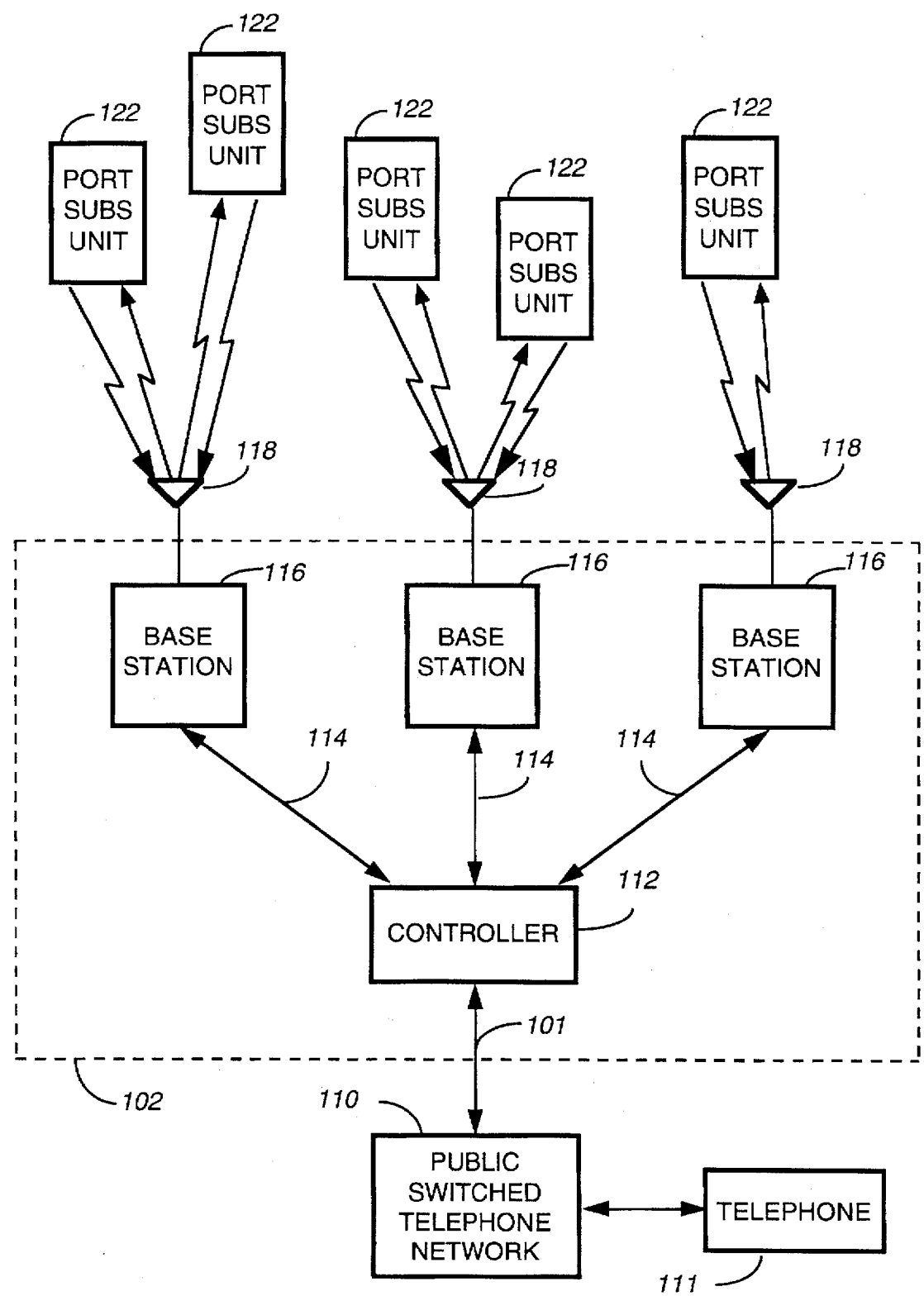
FIG. 1 is an electrical block diagram of a radio communication system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of conventional portable subscriber units 122, preferably having acknowledge-back capability, such as the Tango™ subscriber unit manufactured by Motorola, Inc. of Schaumburg, Ill. The base stations 116 are used for communicating with the portable subscriber units 122 utilizing conventional radio frequency (RF) techniques, and are coupled by communication links 114 to the controller 112, which controls the base stations 116. The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized as well for the portable subscriber unit 122, the controller 112, and the base stations 116.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and data or voice messages originated by a caller. The RF signals transmitted by the portable subscriber units 122 to the base stations 116 (inbound messages) comprise responses that include positive acknowledgments (ACKs), negative acknowledgments (NAKs), and unscheduled messages. An embodiment of an acknowledge-back messaging system is described in U.S. Pat No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols can be used as well. It will be further appreciated that, alternatively, a one-way radio communication system can be utilized, with some limitations, in accordance with the present invention.

Figure 2:
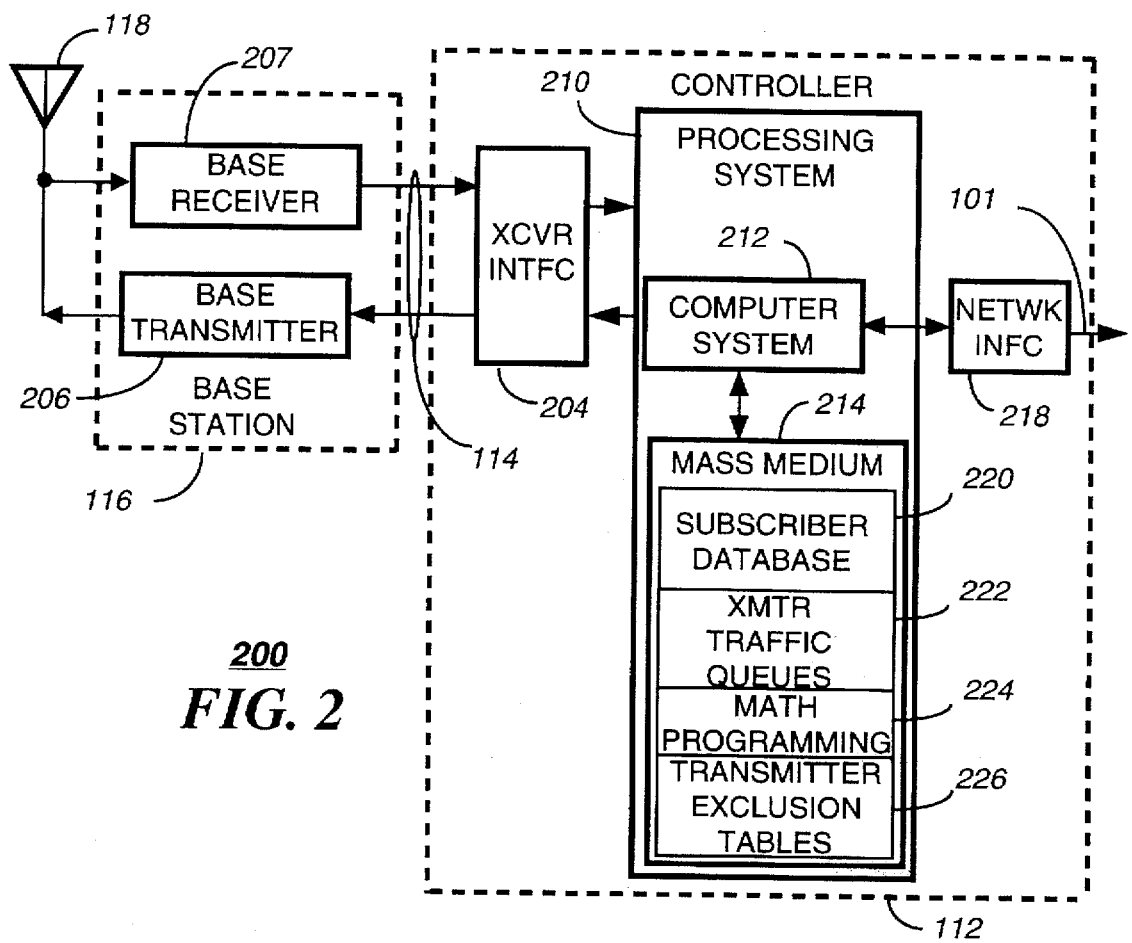
FIG. 2 is an electrical block diagram of portions of a controller and base station in accordance with the present invention.

FIG. 2 is an electrical block diagram 200 of portions of the controller 112 and the base station 116 in accordance with the present invention. The controller 112 includes a processing system 210, a transceiver interface 204, and a network interface 218. The base station 116 includes a base transmitter 206 and, preferably, at least one base receiver 207.

The processing system 210 is used for directing operations of the controller 112. The processing system 210 preferably is coupled through the transceiver interface 204 to the base transmitter 206 via the communication link 114. The processing system 210 preferably also is coupled through the transceiver interface 204 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The mass storage medium 214 is programmed to include, for example, a subscriber database 220, comprising subscriber user information such as addressing and programming options of the portable subscriber units 122. The mass storage medium 214 also is programmed to include transmitter traffic queues 222 for providing a measure of the message traffic in queue for each of the base transmitters 206. In addition, the mass storage medium 214 includes software comprising a mathematical programming element 224 for performing a linear or integer programming technique to allocate channels for the system in accordance with the present invention. The mass storage medium 214 is further programmed with transmitter exclusion tables 226, containing values based upon co-channel and adjacent-channel interference between pairs of the base transmitters 206.

The conventional computer system 212 is preferably programmed by way of this and other software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207. It will be further appreciated that, alternatively, in some systems the transmitter 206 can be arranged such that it can transmit a plurality of independent messages on a plurality of communication channels at the same time.

Figure 3:
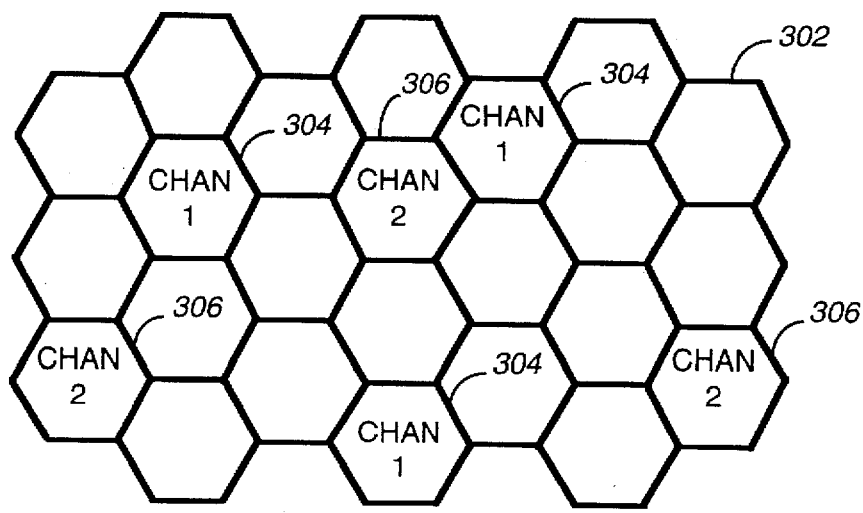
FIG. 3 is a coverage diagram of the radio communication system in accordance with the present invention.

Referring to FIG. 3, an exemplary coverage diagram of the radio communication system in accordance with the present invention depicts a plurality of cells 302. The cells 302 indicate a coverage area served by each of the base stations 116. Radio channels are allocated such that the channels are reused when there is adequate separation between cells to meet the interference constraints. For example, channel 1 is depicted as reused by the cells 304, while channel 2 is reused in the cells 306. An objective according to the present invention is to minimize the number of channels required to handle the existing message traffic, consistent with the interference constraints, thereby maximizing the air-time efficiency.

Figure 4:
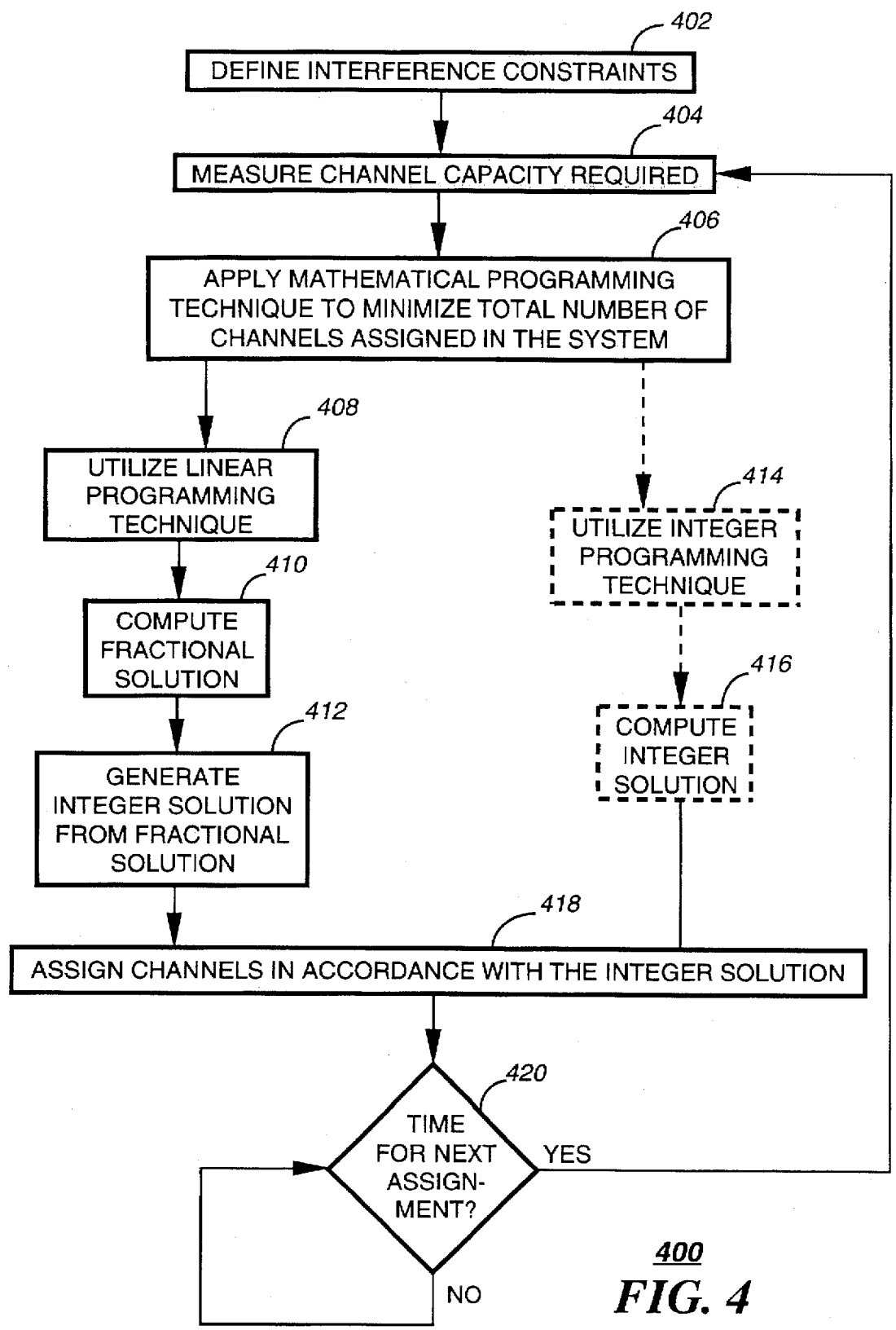
FIG. 4 is a flow chart depicting operation of the radio communication system in accordance with the present invention.

Referring to FIG. 4, a flow chart depicts operation of the radio communication system in accordance with the present invention. First, the interference constraints for the system are defined 402. Preferably, this includes developing and storing the transmitter exclusion tables 226 based upon both co-channel and adjacent-channel interference between pairs of transmitters. This task preferably is performed by making measurements of interference during system installation. Alternatively, the transmitter exclusion tables 226 can be estimated mathematically using well-known techniques based on transmitter power, antenna height and gain, and transmitter separation. Preferably, the transmitter exclusion tables 226 also are adjusted with multi-ring or other traffic location information, such as that described in U.S. patent application Ser. No. 08/597,049 filed Feb. 5, 1996 by Lin et al., entitled "Method and Apparatus for Transmitting an Outbound Message in a Two-Way Messaging System." Once the transmitter exclusion tables have been developed, an exclusion value threshold is selected and stored in the mass medium 214. The exclusion value threshold represents an amount of interference beyond which the interference constraints are considered violated, and it preferably is selected such that adequate reception is achievable by the portable subscriber unit 122 at the outer boundary of each of the cells 302.

Next, the channel capacity required for each of the base transmitters 206 is measured 404 by the processing system 210. Preferably, the channel capacity required is dynamically determined from the transmitter traffic queues 222 by examining the total amount of traffic currently in queue for each of the base transmitters 206. In the simplest case, the channel capacity preferably is measured as being directly proportional to the queue size. It will be appreciated that, if desired, a more sophisticated stochastic model can be used instead to measure the required channel capacity. Alternatively, the channel capacity can be estimated from demographic data for the area served by the radio communication system. After the channel capacity is determined, the processing system 210 applies 406 a mathematical programming technique to minimize the total number of channels assigned in the system. For large systems the mathematical programming technique is preferably a linear programming technique 408, which is easily solved through a well known linear programming algorithm, such as the simplex method. The linear programming technique, however, can produce 410 a fractional solution, which can present some administrative difficulties in channel-to-transmitter assignment. To overcome these difficulties an integer solution is preferably generated 412 from the fractional solution. Then, channels are assigned 418 to the base transmitters 206 in accordance with the integer solution. In one alternative embodiment (discussed further below) the channels are allocated directly from the fractional solution.

Alternatively, an integer programming technique can be utilized 414 by the processing system 210 to minimize the total number of channels assigned in the system. This approach is particularly applicable to small systems in which the number of decision variables is small. In this case, the processing system 210 computes 416 an integer solution directly through a well-known integer programming algorithm, such as the branch-and-bound technique.

In any event, once the channels have been assigned according to the integer solution, the processing system 210 waits 420 until it is time for a next assignment of channels. Preferably, the waiting time is only one or two minutes, so that channel allocation is quickly adjusted in accordance with traffic requirements. The flow then returns to step 404 to again measure the channel capacity required and to repeat the channel allocation process.

The mathematical model used in accordance with the present invention is as follows. Let the available channels be represented by $C_1, C_2, \ldots, C_m$. Let the channel capacity for $C_i$ be $K_i$. Let the transmitters be $T_1, T_2, \ldots, T_n$. Let the channel capacity required for each transmitter be $R_1, R_2, \ldots, R_n$. Let $cE_{i,j}$ be the co-channel exclusion value between $T_i$ and $T_j$. Let $aE_{i,j}$ be the adjacent-channel exclusion value between $T_i$ and $T_j$. Let L be the exclusion value threshold. Let $w_1, w_2, \ldots, w_n$ be transmitter biases which can be selectively adjusted to give preference to selected transmitters. Let $c(i,j)$ be a channel-to-transmitter assignment value, wherein $c(i,j)=1$ when $C_j$ is assigned to $T_i$, and $c(i,j)=0$ when $C_j$ is not assigned to $T_i$.

The channel allocation problem is to minimize the total number of channels assigned to the transmitters in the system while allocating the required channel capacity to each transmitter and keeping the total interference at each cell below the exclusion value threshold. In mathematical programming terminology, we want to minimize the following objective function:

$$\Sigma\{1 \leq i \leq n, 1 \leq j \leq m\} w_i * c(i,j);$$

subject to traffic requirements $$\Sigma_{\{i\}} K_j * c(i,j) \geq R_i$$

for all $T_i$, and interference requirements (co- and adjacent-channel)

$$\Sigma_{\{j\}}(cE_{i,j}*c(j,k)) + (\Sigma_{\{j, \text{ channel } u \text{ is adjacent to } k\}} aE_{i,j}*c(j,u)) \leq L,$$

for all $c(i,k) > 0$. Channel allocation problems of moderate size can be solved directly using integer programming techniques. For such cases, we simply assign $C_j$ to $T_i$ when the optimal solution computes $c(i,j)=1$. Larger problems preferably are solved with linear programming techniques, which can produce a fractional solution that is then converted into an integer solution through one of several novel heuristics in accordance with the present invention.

Figure 5:
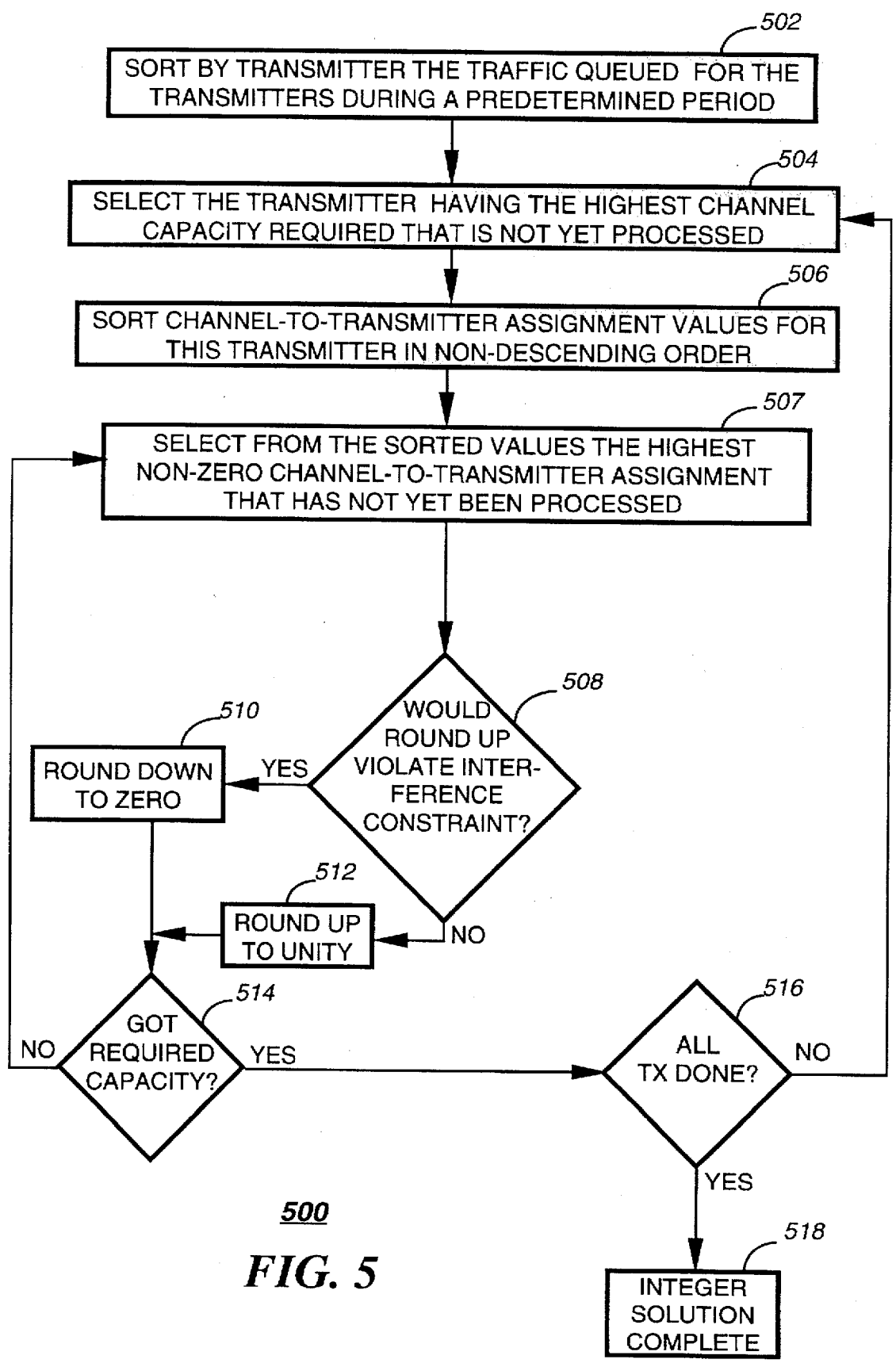
FIG. 5 is a flow chart depicting a deterministic rounding technique utilized by the radio communication system in accordance with the present invention.

Referring to FIG. 5, a flow chart depicts one such heuristic, which is a deterministic rounding technique. The flow chart 500 represents a preferred method of generating the integer solution from the fractional solution to the linear programming technique. First, the processing system 210 sorts 502 by transmitter the traffic queued for the transmitters 206 during a predetermined period, e.g., two minutes. Then, the processing system 210 selects 504 the transmitter 206 having the highest required channel capacity that is not yet processed. Next, the processing system 210 sorts 506 in non-descending order the channel-to-transmitter assignment values corresponding to the selected transmitter 206 (from the fractional solution determined by the traffic corresponding to the predetermined period). The processing system 210 then selects 507 from the sorted values the highest non-zero channel-to-transmitter assignment value that has not yet been processed. The processing system 210 then checks 508 whether rounding up the selected non-zero value would violate an interference constraint. That is, the processing system 210 checks the transmitter exclusion tables to determine whether the exclusion values with respect to the selected transmitter 206 for all other transmitters 206 assigned to the same channel or to adjacent channels additively produce a total exclusion value that is greater than the exclusion value threshold. If so, the processing system 210 rounds down 510 the non-zero value to zero. If not, the processing system 210 rounds up 512 the non-zero value to unity. The processing system 210 then checks whether the transmitter 206 has reached the required channel capacity. If not, the flow returns to step 507 to repeat the selecting and rounding process. When the transmitter 206 has reached its required channel capacity, the processing system 210 checks 516 whether all transmitters 206 have been processed. If not, the flow returns to step 504 to select another transmitter 206. If all transmitters 206 have been processed, the integer solution is complete 518, and channel assignment can be started. This heuristic advantageously ensures that no interference constraint is violated by the rounding process.

A first alternative heuristic is a randomized probabilistic rounding technique. This technique includes randomly rounding the fractional solution periodically, wherein a probability of rounding a channel-totransmitter assignment to unity is equal to a fractional solution value corresponding to the channel-to-transmitter assignment before rounding. In other words, the $c(i,j)$ values of the fractional solution are rounded up to unity in a random manner with the probability of rounding up a particular $c(i,j)$ value being equal to the value before rounding. For example, a value of 0.75 will have a 0.75 probability of being rounded up to unity. The rounding technique is repeated periodically, e.g., every thirty-two transmission frames, to obtain a plurality of integer solutions. Some of the integer solutions will be better than others, based upon the number of violations of interference constraints caused by the rounding and further based upon the total number of channels required. Preferably, the processing system 210 will examine the plurality of integer solutions and will select a best one based on some predetermined criteria, e.g., number of violations of interference constraints and total number of channels, and will then utilize the selected solution for a subsequent period, e.g., two minutes, until a new linear program created from new traffic data is solved.

A second alternative heuristic is a time-sharing technique. In this technique the channel-to-transmitter assignments are time-shared in proportion to values of the fractional solution. This provides the advantage of utilizing an optimal solution for the channel allocation, but carries the disadvantages of being difficult to administer and of potentially violating other operational constraints, such as delivery latency.

Thus it should now be clear that the present invention provides a comprehensive channel allocation method. The present invention provides a channel allocation method that takes into consideration a wide variety of system parameters, including available channels and channel capacities, traffic requirements for each of the transmitters, and interference constraints between the transmitters. The present invention advantageously provides an efficient global channel allocation method that can determine a best overall solution for the entire radio communication system.

What is claimed is:

1. A method for assigning a plurality of channels to a plurality of transmitters in a radio communication system, the method comprising the steps of:

defining interference constraints for the plurality of transmitters;

measuring a channel capacity required to handle traffic for each of the plurality of transmitters;

applying a linear programming technique to minimize a total number of channels assigned in the system, consistent with the interference constraints and the channel capacity required, which can result in a fractional solution of channel-to-transmitter assignment values; and generating an integer solution based upon values of the fractional solution by performing a process selected from a group of processes consisting of process (a), process (b), and process (c), wherein process (a) comprises the step of time-sharing the channel-to-transmitter assignment values in proportion to values of the fractional solution, and wherein process (b) comprises the step of randomly rounding the fractional solution periodically, wherein a probability of rounding a channel-to-transmitter assignment value to unity is equal to a fractional solution value corresponding to the channel-to-transmitter assignment value before rounding, and wherein process (c) comprises the steps of:

sorting by transmitter the traffic queued for the plurality of transmitters during a predetermined period;

selecting a transmitter having a highest channel capacity required that is not yet processed;

sorting the channel-to-transmitter assignment values associated with the transmitter selected;

choosing a highest non-zero one of the channel-to-transmitter assignment values that has not yet been processed;

rounding up the highest non-zero one to unity when no interference constraint is violated as a result;

rounding down the highest non-zero one to zero when an interference constraint would be violated by rounding to unity;

checking how much accumulated channel capacity has been accumulated for the transmitter by the rounding up and rounding down steps;

repeating the choosing, rounding up and rounding down steps when the accumulated channel capacity is less than the channel capacity required for the transmitter; and otherwise, returning to the selecting step to select another transmitter for processing until all transmitters have been processed.

2. The method of claim 1, wherein the defining step comprises the steps of:

determining values for co-channel and adjacent-channel transmitter exclusion tables based upon interference levels between each pair of transmitters; and selecting an exclusion value threshold beyond which a transmitter interference constraint is violated.

3. The method of claim 1, wherein the measuring step comprises the step of dynamically determining the channel capacity required in response to the traffic queued for each of the plurality of transmitters.

4. The method of claim 1, wherein the measuring step comprises the step of estimating the channel capacity required from demographic data available for an area served by the radio communication system.

5. A controller for assigning a plurality of channels to a plurality of transmitters in a radio communication system, the controller comprising:

a processing system for directing operations of the controller;

a network interface coupled to the processing system for receiving messages from message originators; and a transmitter interface coupled to the processing system for controlling the plurality of transmitters to send the messages, wherein the processing system is programmed to:

define interference constraints for the plurality of transmitters;

measure a channel capacity required to handle traffic for each of the plurality of transmitters;

apply a linear programming technique to minimize a total number of channels assigned in the system, consistent with the interference constraints and the channel capacity required, which can result in a fractional solution of channel-to-transmitter assignment values; and generate an integer solution based upon values of the fractional solution by performing a process selected from a group of processes consisting of process (a), process (b), and process (c), wherein process (a) programs the processing system to time-share the channel-to-transmitter assignment values in proportion to values of the fractional solution, and wherein process (b) programs the processing system to randomly round the fractional solution periodically, wherein a probability of rounding a channel-to-transmitter assignment value to unity is equal to a fractional solution value corresponding to the channel-to-transmitter assignment value before rounding, and wherein process (c) programs the processing system to:
    sort by transmitter the traffic queued for the plurality of transmitters during a predetermined period;

select a transmitter having a highest channel capacity required that is not yet processed;

sort the channel-to-transmitter assignment values associated with the transmitter selected;

choose a highest non-zero one of the channel-to-transmitter assignment values that has not yet been processed;

round up the highest non-zero one to unity when no interference constraint is violated as a result;

round down the highest non-zero one to zero when an interference constraint would be violated by rounding to unity;

check how much accumulated channel capacity has been accumulated for the transmitter by the rounding up and rounding down steps;

continue to choose, round up and round down when the accumulated channel capacity is less than the channel capacity required for the transmitter; and otherwise, select another transmitter for processing until all transmitters have been processed.

6. The controller of claim 5, wherein the processing system is further programmed to:

determine values for co-channel and adjacent-channel transmitter exclusion tables based upon interference levels between each pair of transmitters; and select an exclusion value threshold beyond which a transmitter interference constraint is violated.

7. The controller of claim 5, wherein the processing system is further programmed to dynamically determine the channel capacity required in response to the traffic queued for each of the plurality of transmitters.

8. The controller of claim 5, wherein the processing system is further programmed to estimate the channel capacity required from demographic data available for an area served by the radio communication system.

* * * * *